United States Patent Office 3,801,471
Patented Apr. 2, 1974

---

3,801,471
MULTI-STAGE FLASH DISTILLATION PLANT
Kazuo Sato and Kenji Kamiyama, Tokyo, and Koichi Tahara, Kanagawa-ken, Japan, assignors to Agency of Industrial Science & Technology, Tokyo, Japan
Filed Feb. 8, 1971, Ser. No. 113,424
Claims priority, application Japan, Feb. 12, 1970, 45/11,502
Int. Cl. B01d 3/06
U.S. Cl. 202—173                           2 Claims

ABSTRACT OF THE DISCLOSURE

The invention disclosed is for a multi-stage flash evaporator having a plurality of flash chambers separated by partitioning walls wherein seawater is flashed under lower pressure in each subsequent stage after the first stage. A seawater flow path connecting each adjacent pair of flash chambers is provided near its open end on the low-pressure side with means having a bellows-like or accordion-shaped passage having a cross-sectional area smaller than the flow path so as to flash seawater.

---

This invention relates to a multi-stage flash evaporator. Thermodynamically, the seawater desalination plant using the flash evaporation method requires a larger amount of energy for the production of a unit weight of fresh water than the plant using either the refrigeration method or the reverse osmosis method. Nevertheless, this plant is advantageous in that it is operable with low-grade energy such as waste heat occurring in thermal power generation and, because the fluids to be handled are in liquid and gaseous states, it permits large-scale operation and consequent reduction of operating cost. These and other advantages have encouraged developmental research on such systems.

This invention provides a multi-stage flash evaporator capable of producing fresh water in a high yield by approximating the adiabetic evaporation process to the state of theoretical rate production.

The present invention also provides a multi-stage flash evaporator which permits the heat transfer area of the condenser to be decreased in size as compared with that required in the conventional plant and, thereby, to decrease the cost of construction.

Generally, a multi-stage flash evaporator has been constructed such that the seawater heated to high temperature, is first pumped into the flash chamber of the first-stage to be flashed therein. The flash chamber of the last-stage is kept under the lowest pressure by a steam ejector or the like. By virtue of a gradual decline of pressure, rhe seawater is caused to flow in regular succession from the first-stage to the last-stage. Any given stage is maintained under a prescribed pressure by means of the interstage flash means. Hydrodynamically, flash means are broadly classified under the following: (A) an orifice or a perforated plate for reducing the cross-sectional area of the flow path, is disposed in the seawater flow path connecting adjacent stages so that the desired pressure difference is produced through loss of mechanical energy; and (B) two adjacent stages are so positioned relatively to each other such that there arises a static pressure difference by virtue of which there is produced the desired pressure difference.

In the case of a flash chamber having a given number of stages and maintained under a specific pressure by the aforesaid means, if the seawater which is flowing into the chamber has a temperature higher than the equilibrium temperature corresponding to that specific pressure, it undergoes flash evaporation. Simultaneously with the consequent generation of steam, the seawater is deprived of its own sensible heat and the temperature ie reduced proportionally. Generally, however, the temperature of the seawater is not reduced to a temperature low enough for it to be in equilibrium at a given pressure. That is to say, it fails to reach the temperature which is the sum of the saturated steam temperature existing at the pressure in question and the boiling point elevation. This phenomenon is referred to as "non-equilibrium phenomenon in the process of flash evaporation," and the "non-equilibrium loss" is defined as the difference between the seawater temperature less the boiling point elevation on the one hand and the saturated steam pressure on the other.

The fact that the non-equilibrium loss is large implies that the amount of product water is small. In the case of a brine-recirculation type multi-stage flash evaporator, the greater part of the seawater discharged from the flash chamber of the last-stage returns to the condenser tubes in the heat-recovery section and serves the purpose of condensing steam. Since the temperature of the seawater is increased by the non-equilibrium loss, the available temperature difference of the condensers in each of the stages becomes small, making it necessary to enlarge the heat transfer area required. It is, therefore, necessary to reduce this non-equilibrium loss to the fullest possible extent.

A review of the aforementioned two designs of flash means reveals that the design (B) has a higher liquid level and, therefore, provides a higher non-equilibrium loss than the design (A). With this in mind, the relation between the non-equilibrium loss and the operating conditions was examined with respect to the orifice pattern in the design of (A). Consequently, it was discovered that in operating the multi-stage flash evaporator, the interstage pressure difference can be calculated in advance as an operating condition. Where the pressure loss occurring during the passage of the seawater through the orifice is equal to this pressure difference, flash evaporation begins immediately after the seawater has completed its passage through the orifice. When the cross-section at the opening end of the orifice is enlarged without changing the flow rate, flash evaporation begins to occur inside the flow path preceding the orifice although the liquid level of the chamber is higher. At the very point of time at which the seawater is passing through the orifice, there consequently occurs a two-phase flow of seawater and vapor.

Experiment has shown that the non-equilibrium loss gradually decreases when the cross-sectional area at the opening end of the orifice alone is increased while the flow rate of fluid is kept constant. At the evaporation temperature of 60° C., for example, the non-equilibrium loss was 0.61° C. for the standard cross-sectional area of orifice. When the cross-sectional area was doubled, however, the loss fell to 0.43° C. This decline of non-equilibrium loss occurred because in the latter case, there was provided a longer contact time between vapor and seawater which consequently permitted both heat and mass transfers to occur at higher rates than with the former case.

On the basis of the discovery it was found that the non-equilibrium loss can more effectively be decreased by flash means having a flow path with regularly changing cross-sectional area such as that of a bellows-like configuration or one having an accordion-shaped flow path, as contrasted to prior art flash means having conventional orifices. This invention will be explained in greater detail with reference to the accompanying drawings wherein.

Figure 1:
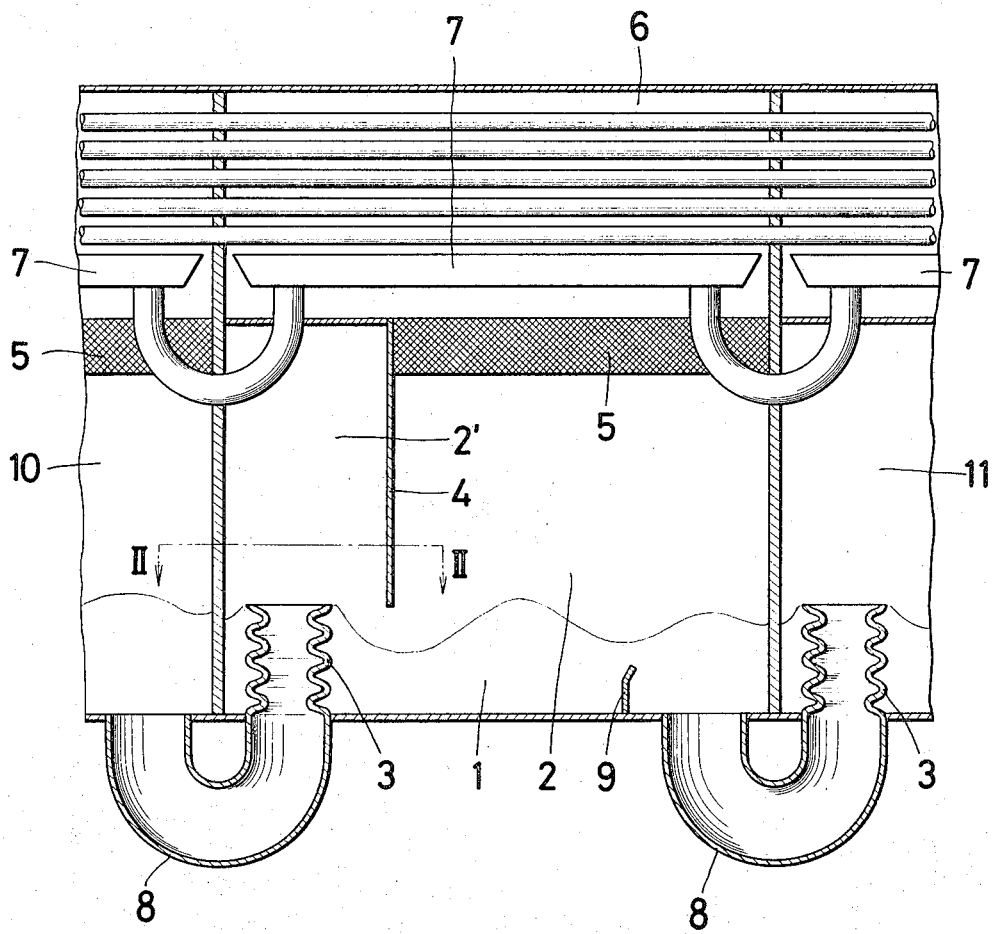
FIG. 1 is a side sectional view of a flash chamber in the multi-stage flash evaporator according to the present invention.
Figure 2:
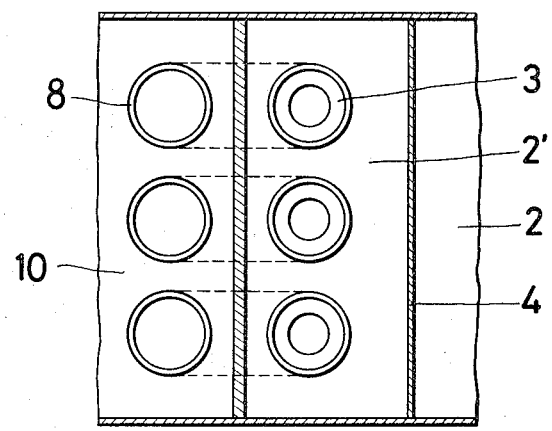
FIG. 2 is a plane view of the evaporator taken along line II—II of FIG. 1.

Referring to FIG. 1 and FIG. 2, the seawater 1 which has been suctioned from the flash chamber of the preceding stage 10 undergoes a pressure loss of a prescribed magnitude determined by 3 and, thereafter undergoes flash evaporation in the flash chamber 2. The resulting two phase current of flashed seawater and vapor is sent up temporarily in the auxiliary flash chamber 2' separated by the baffle plate 4 from the flash chamber 2 and immediately thereafter falls to the liquid below. The seawater and the vapor which have fallen onto the liquid surface flow through the opening formed at the lower end of the baffle plate 4 and reach the flash chamber 2. Then, the vapor ascends and reaches the demister 5, wherein it is deprived of liquid droplets which are entrained thereby. Subsequently, the vapor reaches the condenser chamber 6, wherein it is cooled into a condensate by the cooling seawater which is flowing through the condenser tubes of the chamber 6. The condensate is collected in the product tray 7 and then driven forth to the product tray of the subsequent stage 11 by virtue of pressure difference. On the bottom of the flash chamber 2, a weir 9 is provided optionally if desired.

Figure 3:
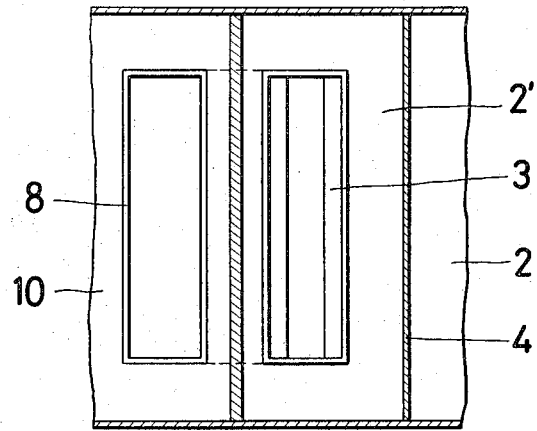
FIG. 3 is a plan view illustrating another embodiment of the flash means according to the present invention.

The pressure flash means 3, as illustrated in FIG. 2, are formed having bellows-like passages configurated such that the cross-sectional area is varied periodically several times while having a minimum cross-section smaller than that of the flow path 8 for transferring the seawater from the flash chamber 10 to the flash chamber 2. These flash means 3 having bellows-like passages are located on the low-pressure side of flash chamber 2 and near the end of the flow path. The open end of the flow path may alternately be constructed in an accordion shape so as to vary the cross-section as illustrated in FIG. 3.

As the seawater flows out of the flash chamber 10 and reaches the first constriction formed in the bellows like passage, the kinetic energy increases and the static pressure decreases as indicated by Bernoulli's formula. If the static pressure is sufficiently small as compared with the pressure of the flash chamber 10, the flash evaporation begins to occur immediately at that position, with the consequence that vapor bubbles are formed in the seawater to give rise to a two-phase fluid of seawater and vapor. At the subsequent portion of an increased cross-section, the two-phase flow has its static pressure increased, though not to the extent of destroying all the vapor bubbles in existence. As the two-phase fluid flows into the second constriction, the static pressure is again reduced and the flash evaporation is promoted proportionally. At this point, new vapor cores are formed and, at the same time, vapor bubbles which are already in existence grow in size. By repeating this process by means of a required number of constrictions incorporated in the bellows like passage, the flashing rate is increased and the contact time between vapor and seawater is lengthened, thus permitting the flash evaporation process to approach more closely the state of equilibrium. In other words, the number of such constrictions is so fixed that the flash evaporation process of seawater will approximate the state of equilibrium.

Figure 4:
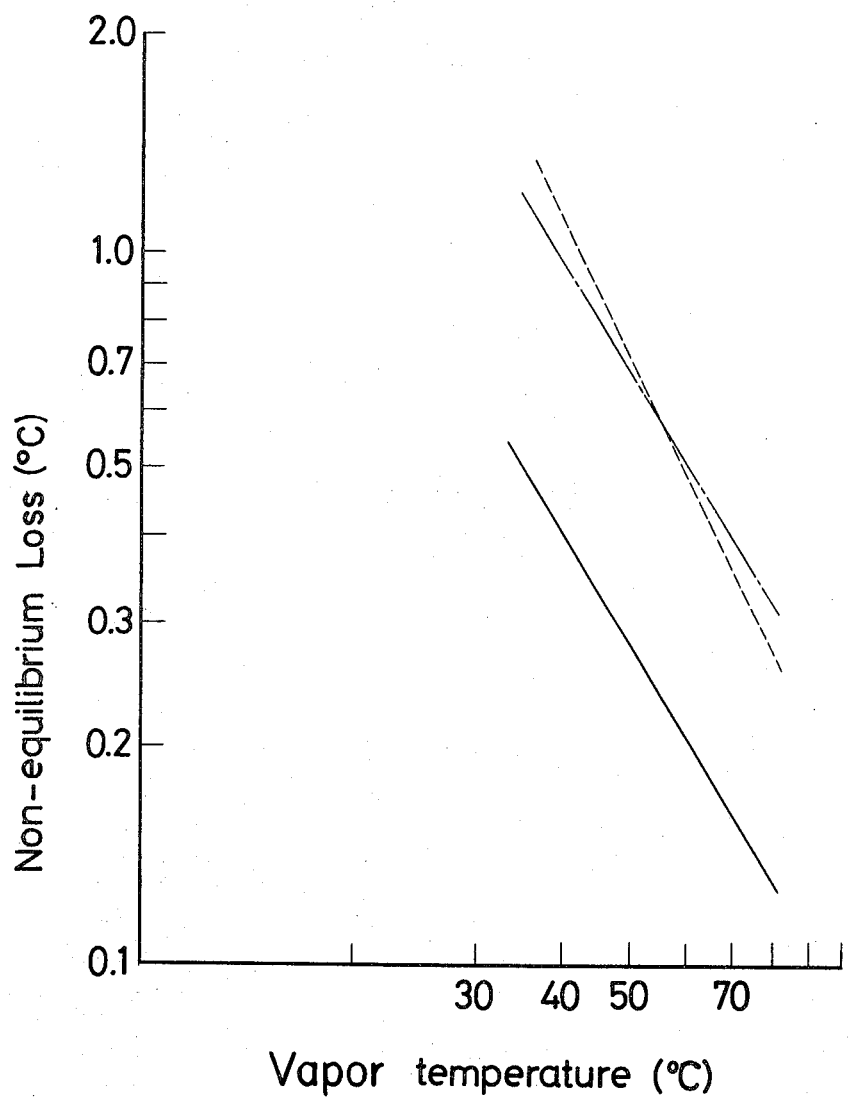
FIG. 4 is a graph illustrating the results of the measurement of non-equilibrium loss obtained when the seawater was flashed by the conventional single-orifice type flash means and by the flash means of the present invention.

In a separate experiment, the seawater was flashed by using the flash means, at two locations of the single-orifice type and the pressure reducing device of the present embodiment. The graph of FIG. 4 illustrates the results of the measurement of non-equilibrium loss obtained in the experiment.

This graph shows the relations between the vapor temperature and the non-equilibrium loss. It is noted that the temperature of the seawater flowing out of the flash chamber is the sum of the saturated vapor temperature, the boiling point elevation and the non-equilibrium loss.

In this graph, the continuous line represents the results obtained with the device of the present embodiment, wherein the ratio of the largest cross section to the smallest cross-section is 5:1 and the number of layers is 4. The dotted line represents the results of the measurement made actually by the inventors on the conventional single-orifice type flash means, while the alternate long and short dash line represents the results of measurement which W.R. Williamson et al. of Cuno Division, American Machine & Foundry Company obtained of the single-orifice type device and published in the "Office of Saline Water Report No. 525."

Comparison of the data reveals that, at all vapor temperatures, the values of non-equilibrium loss obtained for the present embodiment are ½ to ⅓ of those obtained for the single-orifice type devices. This indicates that the flash means of the present embodiment is highly effective in lowering the non-equilibrium loss.

The pressure loss which occurs at the time that the seawater passes this device cannot be calculated unless a solution is given to a more complicated flow equation than that available for the conventional orifice type device. However, the pressure difference required between interstages and the pressure loss afforded by the present device are, in principle, expressed as follows on the basis of Bernoulli's formula:

$$F = \frac{U_1^2 - U_2^2}{2g_0} + \frac{P_1 - P_2}{\rho} + \frac{g(L_1 - L_2)}{g_0}$$

wherein, F denotes the pressure loss expressed in terms of water head, $U_1$ and $U_2$ denote the flow velocity of seawater respectively at the flash chamber on the higher pressure side and at the flash chamber on the lower pressure side, $P_1$ and $P_2$ denote the pressures of the flash chamber on the higher pressure side and that on the lower pressure side respectively, $L_1$ and $L_2$ denote the liquid levels in the flash chamber on the higher pressure side and that on the lower pressure side respectively, $\rho$ denotes the density of seawater, $g$ denotes the acceleration due to gravity and $g_c$ denotes the conversion factor. By disregarding the changes in U and L, the preceding expression can be simplified as follows:

$$F = \frac{P_1 - P_2}{\rho}$$

Let $U_o$ stand for the flow velocity at the constriction of the present device, $U_p$ for the flow velocity in the interstage flow path, $A_o$ for the constricted cross-sectional area and $A_p$ for the cross-sectional area of the interstage flow path, and the pressure loss F which is directly proportional to the kinetic energy will be expressed by the following equation, wherein $K_o$ is used to denote the flow coefficient:

$$F = \frac{K_o}{2g_0}\left(1.18 - \frac{A_o}{A_p}\right)^3 (U_o - U_p)^2$$

From the experimental results obtained by the inventors, $K_o$ for the conventional pressure reducing device was 1.68. In the present pressure reducing device the non-equilibrium loss can be effectively reduced by fixing the value of $A_o/A_p$ at 0.5 or less.

If the relation between the flow coefficient $K_o$ and the pressure loss is experimentally determined in advance with respect to the typical shape and dimensions of the present device, it will permit easy drawing of a detaied design.

The preceding example represents a case wherein the cross-sectional shape of the internal wall of the flow path is varied circularly. Otherwise, the flow path may be formed in the shape of a parabola, a sine wave, a triangular ditch, a rectangular ditch, or the like.

The investigation conducted by the inventors has shown that, at the last stage of the multi-stage flash evaporator, the non-equilibrium loss obtainable for the evaporation temperature of 35° C. is 0.5° C. in the case of the device of the present invention compared with 1.2° C. by the conventional orifice type device.

When the total heat transfer area of the condenser in the multi-stage flash evaporator of the present invention is compared, on the basis of the preceding results, with that in the conventional single-orifice type multistage flash distillation plant, there are derived the following data.

It is assumed that in the plant using the device of the present invention, the inlet and outlet temperatures of the cooling seawater which is passing through the condenser tubes of each stage differ by 7° C. and 5° C. respectively from the vapor temperatures at the corresponding points. Then, in the case of the plant using the single-orifice type device, the differences will be lowered by the non-equilibrium loss respectively to 6.3° C. and 4.3° C. Assume the flash down per stage to be 2° C., and the effective temperature differences at the outer surface of the condenser tubes will be 5.944° C. and 5.237° C. respectively.

If the total amount of heat transfer and the overall heat transfer coefficient for the two types are equal, then the ratio between the heat transfer areas is the reciprocal of the ratio between the effective temperature differences. Therefore, the heat transfer area of the present invention is equal to 88.1% of heat transfer area of the single-orifice type.

In the evaporator of this invention, the cost of the condenser tubes accounts for 30.8% of the cost of fresh water production as compared with about 35% for the conventional plant.

The total flash down between the first stage and the last stage is 0.7° C. which is higher for the present invention. From this, it follows that the total flash down in the plant of this invention is 85.7° C. where that in the single-orifice type plant is 85° C. This means that the cost of fresh water production is 0.8% greater for the plant of this invention.

The reduction in the cost of the condenser tubes and the increase in the amount of fresh water production are such that the multi-stage flash evaporator of the present invention is found to provide a 5% saving in the overall cost of the production of a unit weight of fresh water.

What is claimed is:

1. A multi-stage flash evaporator which comprises in combination, a plurality of flash evaporator stages connected in horizontal series and each partitioned by a plate, a baffle plate disposed from an upper surface of each stage and defining an auxiliary flash chamber with a plate along one side of the stage and defining a flash chamber with a plate along the opposite side of the stage, said flash chamber having a demister, a condenser and a product tray all disposed at the top thereof, said demister disposed between the baffle plate and the plate along said opposite side of the stage and below the condenser and product tray, and a weir disposed at the bottom thereof to prevent short passage of vapor; a seawater flow path means leading from the bottom of a flash chamber of one evaporator stage and to the auxiliary flash chamber of an adjacent flash evaporator stage at the bottom thereof with flash means disposed in the water flow path along the bottom of the stage, said flash means having a bellows configuration.

2. The multi-stage flash evaporator according to claim 1, wherein the cross-sectional shape of the flow path for transferring seawater from one flash stage to said flash means is rectangular.

References Cited

UNITED STATES PATENTS

| | | | |
|---|---|---|---|
| 3,180,805 | 4/1965 | Chirco | 159—2 MS |
| 3,619,378 | 11/1971 | Ricard | 202—236 |
| 3,203,464 | 8/1965 | Kingma | 202—173 |
| 3,461,038 | 8/1969 | Lind | 202—173 |
| 3,427,227 | 2/1969 | Chamberlin | 202—173 |
| 3,488,260 | 1/1970 | Gilbert | 202—173 |
| 2,908,618 | 10/1959 | Bethon | 203—11 |
| 2,759,882 | 8/1956 | Worthen et al. | 202—174 |
| 3,630,851 | 12/1971 | Kawaguchi et al. | 202—173 |

WILBUR L. BASCOMB, JR., Primary Examiner

U.S. Cl. X.R.

203—11; 159—2 MS